United States Patent [19]

Savatier

[11] Patent Number: 5,144,424
[45] Date of Patent: Sep. 1, 1992

[54] APPARATUS FOR VIDEO DATA QUANTIZATION CONTROL

[75] Inventor: Tristan Savatier, Los Angeles, Calif.

[73] Assignee: Thomson Consumer Electronics, Inc., Indianapolis, Ind.

[21] Appl. No.: 776,022

[22] Filed: Oct. 15, 1991

[51] Int. Cl.$^5$ ............................................. H04N 7/133
[52] U.S. Cl. .................................... 358/133; 358/136
[58] Field of Search .................. 358/133, 135, 136, 12

[56] References Cited

U.S. PATENT DOCUMENTS

| | | | |
|---|---|---|---|
| 4,821,119 | 4/1989 | Gharavi | 358/136 |
| 4,862,173 | 8/1989 | Nishitani | 341/200 |
| 4,887,156 | 12/1989 | Ohki | 358/133 |
| 4,954,892 | 9/1990 | Asai et al. | 358/133 |
| 4,970,591 | 11/1990 | Ohki | 358/136 |
| 4,972,260 | 11/1990 | Fujikawa et al. | 358/136 |
| 4,984,076 | 1/1991 | Watanabe | 358/133 |

*Primary Examiner*—Howard W. Britton
*Attorney, Agent, or Firm*—Joseph S. Tripoli; Eric P. Herrmann; Ronald H. Kurdyla

[57] ABSTRACT

Apparatus for quantizing compressed viedo data arranged in macroblocks calculates a quantizing parameter independently for each macroblock. The apparatus determines the relative coding complexity of respective macroblocks, and then determines which of the more complex macroblocks can withstand relatively severe quantization without significantly affecting image quality. This determination is made on the basis of the relative amount of codewords in blocks associated with respective macroblocks. In general, the data required to encode each one of the associated blocks is compared to find the block with the minimum data associated with each macroblock. A scale factor is then generated which is a function of the amount of data in the minimum block associated with a macroblock and the average of the data for all the minimum blocks in an image frame. The scale factor is utilized to scale a global quantization value applied to at least a portion of a frame of compressed video data.

9 Claims, 4 Drawing Sheets

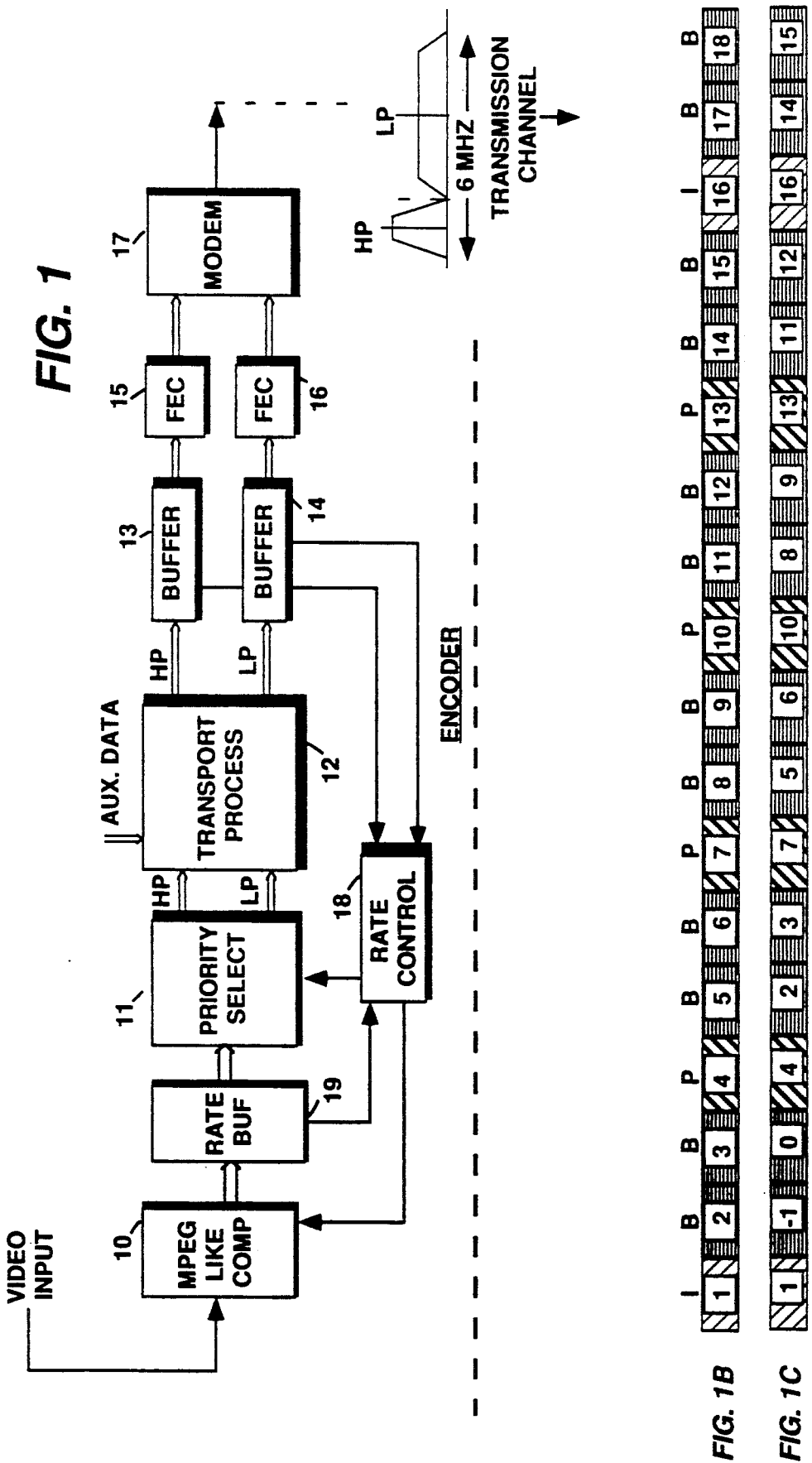

APPARATUS FOR VIDEO DATA QUANTIZATION CONTROL

This invention relates to apparatus and methods for controlling the quantization of video data.

BACKGROUND OF THE INVENTION

The reproduction of video images can be significantly enhanced if the image information is provided in digital format. However real time digitally coded video signals occupy significantly more bandwidth than analog video signals. In addition the data rates available in present transmission channels are limited to rates nominally insufficient to handle raw digitally encoded video signals. Hence the digital video signals are compressed before transmission.

Compressed video data occurs at variable rates, that is, respective frames include different amounts of compressed data. It is desirable to transmit the compressed data at a constant rate equivalent to the channel capacity to realize efficient use of the channel. Rate buffers are implemented to perform variable to constant rate translation. The amount of data provided to the buffers is regulated in accordance with buffer occupancy. This is effected by monitoring the buffer occupancy to generate control signals. Typically the compressors include apparatus which variably quantize compressed data, according to some function of the control signals, to regulate the amount of compressed data provided to the rate buffers.

A first currently known method, which may be used to calculate the level of quantization required to compress video data to a particular rate, computes a quantization step size which is applied to an entire frame. This method provides a uniformly quantized image over respective frames, but it is difficult to determine quantization levels which provide data at precisely the desired rate. A second method divides each frame into blocks and generates quantization levels on a block basis. This method more closely provides compressed data at the desired rate, however, because different areas of the image are quantized differently, the image may not be reproduced with uniform quality.

The present invention includes apparatus for quantizing video signal on a block by block basis to provide data at a relatively constant rate, and which tends not to introduce non-uniformities in image quality.

SUMMARY OF THE INVENTION

The present invention is apparatus in a video signal encoder for adaptively controlling the quantization of macroblocks of compressed video image data. A quantization level is calculated independently for each macroblock (a macroblock includes a plurality of blocks (e.g. 4) representing for example 8×8 matrices of pixels). The apparatus determines the relative coding complexity of respective macroblocks, and then determines which of the more complex macroblocks can withstand relatively severe quantization without significantly affecting image quality. This determination is made on the basis of the relative amount of codewords in blocks associated with respective macroblocks. In general, the data required to encode each one of the associated blocks is compared to find the block with the minimum data associated with each macroblock. A scale factor is then generated which is a function of the amount of data in the minimum block associated with a macroblock and the average of the data for all the minimum blocks in an image frame. The scale factor is utilized to scale a global quantization value applied to at least a portion of a frame of compressed video data.

BRIEF DESCRIPTION OF THE DRAWINGS

FIG. 1 is a block diagram of a video signal compression apparatus including a quantizer embodying the present invention.

FIGS. 1B and 1C are block representations of frames of video signal coded according to the sequence of coding modes associated with MPEG-like compression.

DETAILED DESCRIPTION

The invention will be described in the environment of a high definition television signal encoder but is in general applicable to any video signal encoding system which provides blocks of compressed data subject to quantization, as for example a CD-I system. For purposes of this disclosure the video data will be compressed in MPEG like format. What is meant by "MPEG like" is a coding format similar to the coding format being established by the International Organization for Standardization. The format is described in the document "International Organization of Standardization", ISO-IEC JT(1/SC2/WG1), Coding of Moving Pictures and Associated Audio, MPEG 90/176 Rev. 2, Dec. 18, 1990.

In the MPEG system, odd fields of successive video frames are compressed according to one of three types of compression algorithms, intraframe coded (I), predictive coded (P), or bidirectional predictive coded (B). Even fields are discarded. An example of which of successive frames are encoded by respective algorithms is illustrated in FIG. 1B. In FIG. 1B the numbered boxes correspond to respective successive frame intervals. The letters above each box correspond to the encoding type applied to the adjacent frame.

FIG. 1 illustrates an exemplary HDTV apparatus for encoding video signal in an MPEG like format. In the HDTV system both odd and even fields of each frame are encoded. FIG. 1 shows the system processing a single video input signal, but it is to be understood that the luminance and chrominance components are compressed separately, and that luminance motion vectors are utilized for generating compressed chrominance components. The compressed luminance and chrominance components are interleaved to form macroblocks for transmission.

A sequence of image fields/frames as per FIG. 1B is applied to a compressor 10 which generates a compressed sequence of frames (FIG. 1C) that are coded according to an MPEG-like format. The numbers in the boxes represent successive frames and the letters I,P,B indicate the mode of compression applied to the associated frame, The coding I,P,B sequence illustrated for frames 1-15 cyclically repeats.

Figure 3:
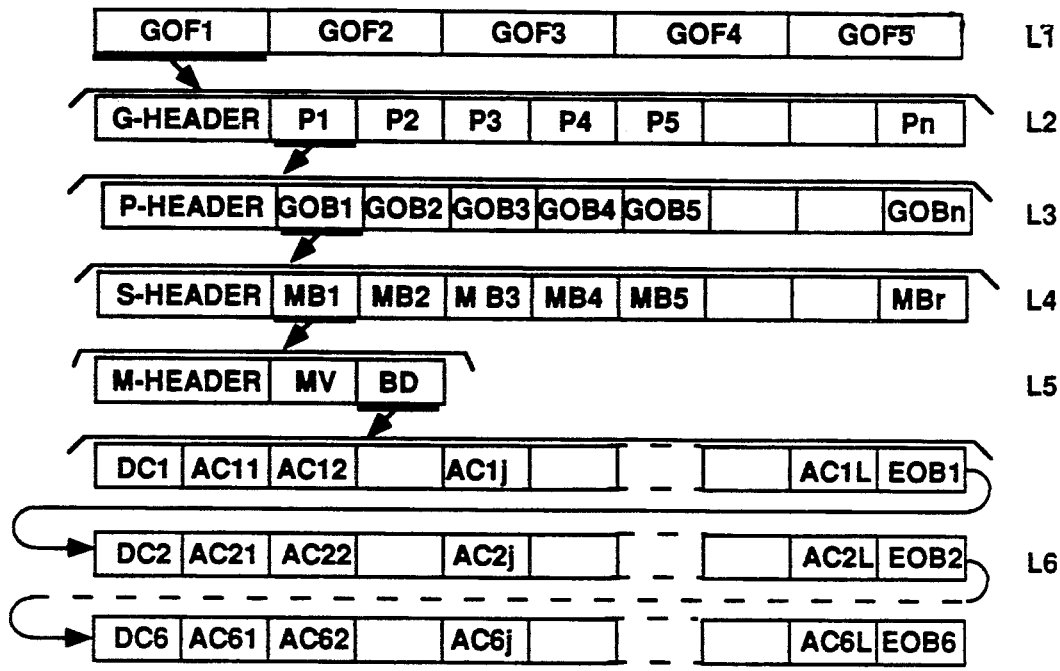
FIGS. 2 and 3 are pictorial diagrams representing the coding format of an MPEG-like signal.
Figure 2:
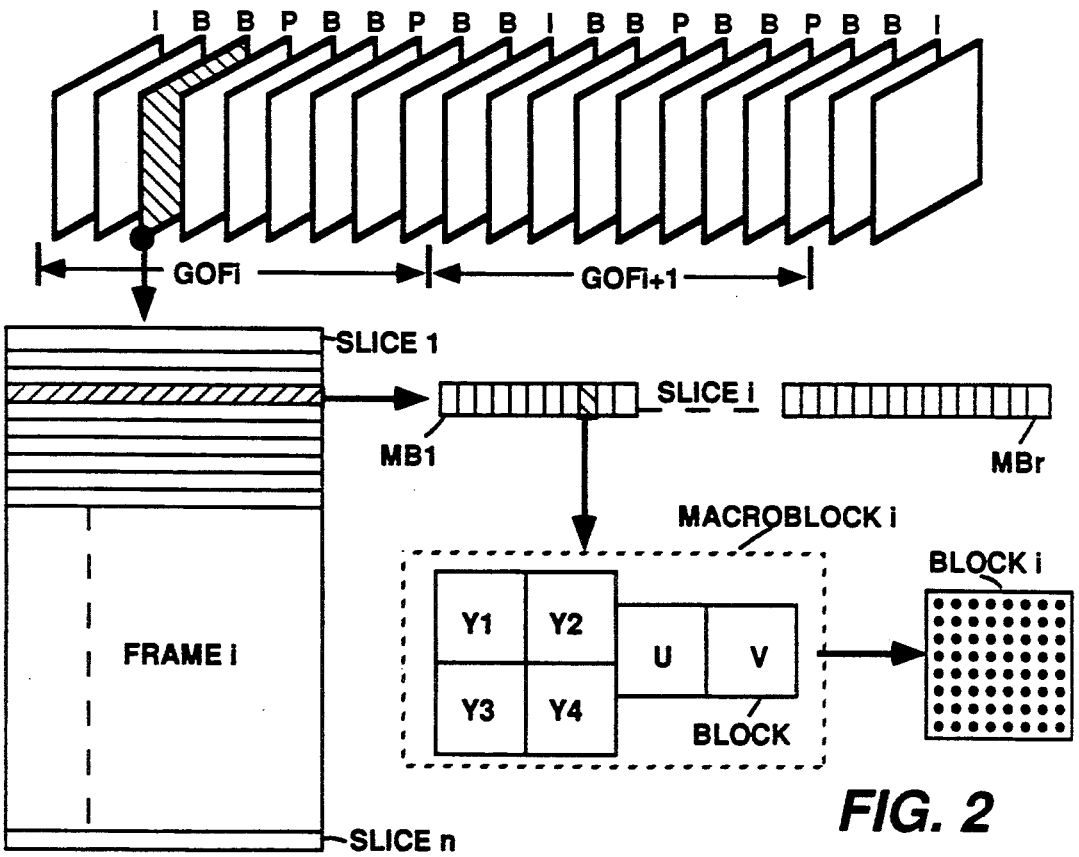

The MPEG hierarchical format, illustrated in abbreviated form in FIG. 3A, includes a plurality of layers each with respective header information. Nominally each header includes a start code, data related to the respective layer and provision for adding header extensions. Much of the header information (as indicated in the referenced MPEG document) is required for synchronization purposes in an MPEG system environment. For purposes of providing a compressed video signal for a digital HDTV simulcast system, only descriptive header information is required, that is, start codes and optional extensions may be excluded. The respective layers of the coded video signal are illustrated pictorially in FIG. 2.

When referring to the MPEG-like signal produced by the present system what is meant is that a) successive fields/frames of video signal are encoded according to an I, P, B coding sequence, and b) coded data at the picture level is encoded in MPEG-like slices or group of blocks albeit that the number of slices per field/frame may differ and the number of macroblocks per slice may differ.

The coded output signal of the present system is segmented in groups of fields/frames (GOF) illustrated by the row of boxes L2 (FIG. 3A). Each GOF (L2) includes a header followed by segments of picture data. The GOF header includes data related to the horizontal and vertical picture size, the aspect ratio, the field/frame rate, the bit rate, etc.

The picture data (L3) corresponding to respective fields/frames includes a header followed by slice data (L4). The picture header includes a field/frame number and a picture code type. Each slice (L4) includes a header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Note each macroblock is comprised of 6 blocks, including four luminance blocks, one U chrominance block and one V chrominance block. See FIG. 2. A block represents a matrix of pixels, e.g., 8×8 over which a discrete cosine transform (DCT) is performed. The four luminance blocks are a 2×2 matrix of contiguous luminance blocks representing, e.g., a 16×16 pixel matrix. The chrominance (U and V) blocks represent the same total area as the four luminance blocks. That is the chrominance signal is subsampled by a factor of two horizontally and vertically relative to luminance, before compression. A slice of data corresponds to data representing a rectangular portion of an image corresponding to an area represented by a contiguous group of macroblocks.

The block coefficients are provided one block at a time with the DCT, DC coefficient occurring first followed by respective DCT AC coefficients in the order of their relative importance. An end of block code EOB is appended at the end of each successively occurring block of data.

The amount of data provided by the compressor 10 is determined by the rate control element 18. As is well known compressed video data occurs at variable rates. Rate buffers 13 and 14 perform a variable to constant data rate translation. The buffers 13 and 14 include circuitry to indicate their respective level of occupancy. These indications are applied to the rate controller 18 to adjust the average data rate provided by the compressor 10. The adjustment is accomplished by adjusting the quantization applied to the DCT coefficients.

Compressed video data hierarchically formatted as indicated in FIG. 3A is coupled to a priority select element 11, which parses the coded data between a high priority channel HP and a low priority channel LP. High priority information is the least data needed to create an image, albeit less than a perfect image. Low priority information is the remaining information.

The HP and LP compressed video data are coupled to a transport processor 12 which a) segments the HP and LP data streams into transport blocks, b) performs a parity or cyclic redundancy check on each transport block and appends the appropriate parity check bits thereto, and c) multiplexes the auxiliary data with the HP or LP video data.

The HP and LP data streams from the transport processor 12 are applied to the respective rate buffers 13 and 14, which convert the variable rate compressed video data from the processor 12 to data occurring at a substantially constant rate. The rate adjusted HP and LP data are coupled to forward error encoding elements 15 and 16 which a) perform REED SOLOMON forward error correction encoding independently to the respective data streams; b) interleave blocks of data to preclude large error bursts from corrupting a large contiguous area of a reproduced image; and c) append, e.g., Barker, codes to the data for synchronizing the data stream at the receiver. Thereafter the signals are coupled to a transmission modem wherein the HP channel data quadrature amplitude modulates a first carrier and the LP channel data quadrature amplitude modulates a second carrier displaced from the first carrier by approximately 2.88 MHz. The 6 dB bandwidth of the modulated first and second carriers are respectively about 0.96 MHz and 3.84 MHz.

Compression in the I mode includes dividing the I designated frame into for example blocks of 8×8 pixels, and performing a discrete cosine transform, DCT, on the pixels in the respective blocks. Thereafter quantization is performed on the coefficients generated by the DCT, which quantized coefficients constitute the compressed image information for the I encoded frame.

Compression in the P mode includes A) dividing a respective P designated frame into macroblocks of for example 4 contiguous 8×8 blocks of pixels; B) searching the last occurring P or I frame within the GOF for a macroblock containing similar image information; C) generating motion vectors to translate the macroblock found in the prior I or P frame to the location of the similar macroblock in the P frame being compressed: D) generating a predicted frame from the prior frame using the motion vectors; E) subtracting the predicted frame from the P frame being compressed on a block by block basis, to generate blocks of residues; F) performing DCT's on the blocks of residues; G) quantizing the coefficients of the blocks of transformed residues; and H) concatenating the quantized residue coefficients and the motion vectors to form a compressed video signal.

Compression of B designated frames is similar to compression of P designated frames with the exception that motion vectors and consequently predicted B frames are formed with respect to I and/or P designated frames between which the B frame is disposed in the sequence. That is the P designated frames are compressed in relation to only the lastmost occurring P or I designated frame, while the B designated frames are compressed in relation to not only the lastmost occurring I or P designated frame, but also the next occurring I or P designated frame. As such the P designated frames are forward predicted and the B frames are forward and backward predicted.

Depending upon the particular system and the compression desired, the quantized coefficients and the motion vectors may be subjected to further data reduction via statistical coding or DPCM coding or both for example.

Figure 4:
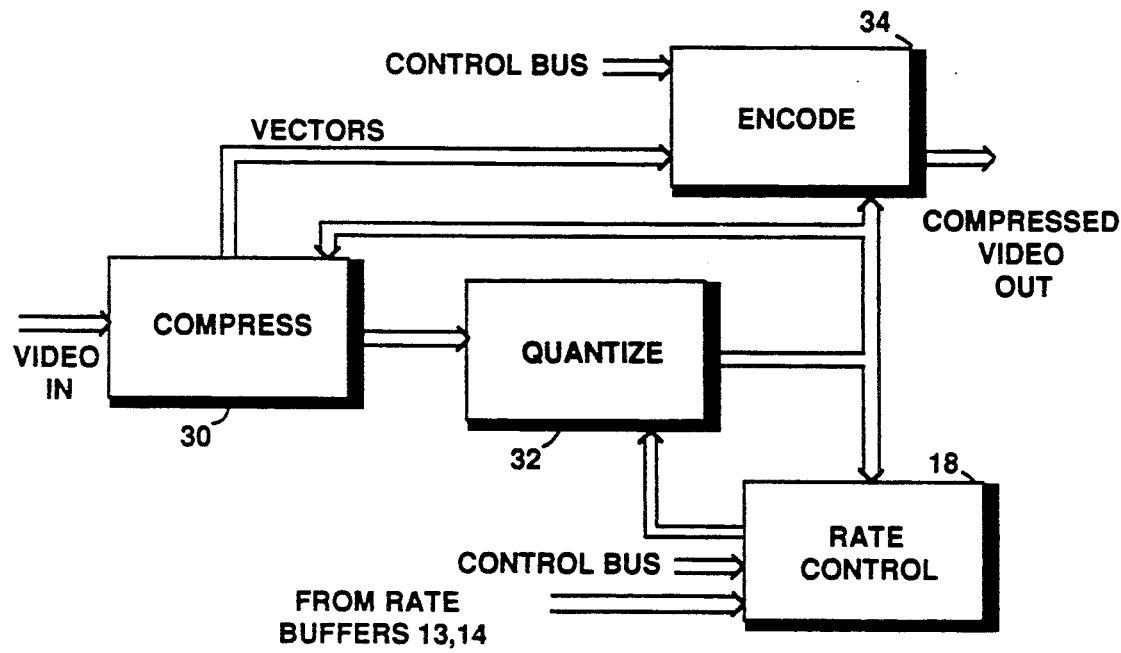
FIG. 4 is a more detailed block diagram of a portion of the MPEG-like compressor of FIG. 1.

FIG. 4 shows the compressor 10 in slightly more detail. The compressor includes a compression element 30 which generates motion vectors and DCT coefficients, and may be similar to the compression apparatus disclosed in U.S. Pat. No. 4,972,260, entitled APPARATUS FOR CODING A MOVING-PICTURE SIGNAL. The DCT coefficients are coupled to a quantizing element 32, and the motion vectors are applied to an encoder 34. Quantized DCT coefficients from element 32 are coupled to the encoder 34 wherein they are multiplexed with the motion vectors and header data to form the compressed video signal.

Figure 5:
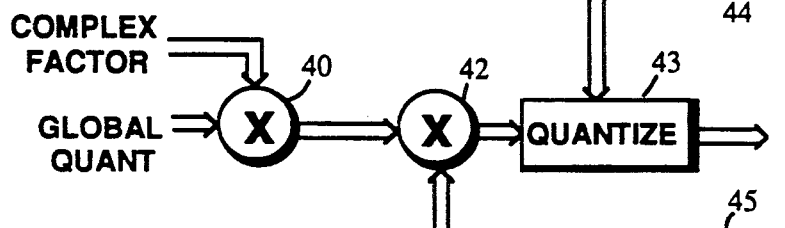
FIG. 5 is a partial schematic drawing-partial pictorial representation of a quantization apparatus and function.

The quantizer receives the DCT coefficients according to a predetermined matrix pattern for each block of pixels, which pattern is exemplified by the box 44 in FIG. 5. The upper left most square labelled DC is the average value of the amplitude of all the pixels associated with the block. The squares labelled A1-A63 correspond to AC coefficients or different frequency spectra. The higher ordinally numbered coefficients generally are of lesser importance for image reproduction. The arrows indicate the sequence in which the coefficients occur. The quantizer also receives quantization control information such as a global quantization value GLOBAL_QUANT and a macroblock complexity factor, MB_comp.

The quantizer includes a general quantization pattern (for example block 45 in FIG. 5) which is a matrix of relative quantization values associated with respective coefficients of the DCT matrix, i.e. g0, g1, g2, g3, are associated with coefficients DC, A1, A2, A3, etc.. The quantization values, GLOBAL_QUANT, and MB_comp are combined according to the relation G $$Gi = MB\_comp * GLOBAL\_QUANT * gi$$

and the respective values Gi are used to control the quantization of coefficients Ai. In FIG. 5 the value G is provided by the multiplier 42 and applied to the quantizer 43. The quantizer 43 is arranged to provide the desired quantization function. An example of a particular quantization function is given by:

$$QAi = (16*Ai + 8)//(2*Gi); Ai > 0$$

$$QAi = (16*Ai - 8)//(2*Gi); Ai < 0$$

$$QAi = 0; Ai = 0$$

where QAi is the quantized version of coefficient Ai and // specifies integer division.

The quantization operation may provide different functions for frames or macroblocks encoded according to the different modes. For example different matrices of relative quantization values, gi, may be used for respective I, P, and B frames. This however is not material to the present invention. What the present invention attempts to accomplish is to provide quantization control to a quantizer such that image quality over a frame will not be non-uniformly affected by virtue of the quantization, while at the same time quantizing, relatively severely, ones of the macroblocks of coefficients which are relatively complicated to encode. This is accomplished by establishing a target value of the amount of compressed data for respective frames from which global quantization values are calculated, and generating a complexity factor for each macroblock in a frame by which the global quantization values may be modified on a macroblock basis.

Generating the complexity factor will be considered first. Here, what is considered is the complexity of a macroblock relative to the blocks within the respective macroblock and the blocks surrounding the macroblock. If all macroblocks are equally complex they may be quantized equally without causing non-uniform quantizing affects. Alternatively, if equally complex macroblocks are quantized differently, non-uniform quantizing effects may occur. In order to achieve significant compression, however, it is necessary to quantize blocks or macroblocks unequally within a frame. The problem then is to determine when/where quantization effects may occur but will be least visible. This is accomplished as follows. For each frame a two pass process is performed. During the first pass of each frame, the frame is compressed in intraframe mode and the coefficients are quantized with a constant value, which may, for example, be the average quantization value for the previous frame. The number of bits (count value) of compressed, quantized AC coefficients for each block is recorded (the actual codewords are discarded). Next, for each macroblock, the count value MB_x for the block (from an associative group of blocks) having the least number of coded bits is determined. After all the MB_x for the frame are determined, the average value MB_xa of the MB_x is calculated. The complexity factor, MB_comp, for each macroblock is computed from the relation;

$$MB\_comp_i = ((K1)(MB\_xi) + (K3)(MB\_xa))/((K2)(MB\_xa) + (K4)(MB\_xi))$$

where K1, K2, K3, and K4 are constants that are determined empirically. It has been found that values of K1=2; K2=2; K3=1 and K4=1 provide good results. For K3 and K4 equal to one, the value of MB_comp ranges from 1/K2 (in lesser complex image areas) to K1 (in most complex image areas). Note that for images with uniform texture, MB_comp will equal one for every macroblock.

Figure 6:
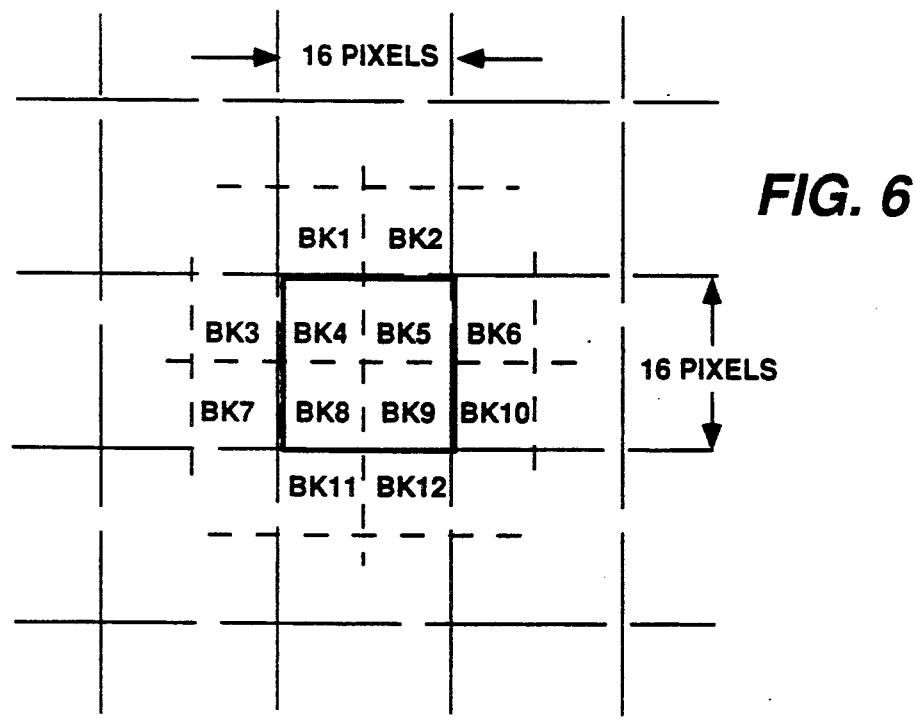
FIG. 6 illustrates the relative location of blocks of data used in generating the quantization complexity signal for associated macroblocks.

The associated blocks from which MB_x is selected for a respective macroblock are illustrated in FIG. 6. In FIG. 6 the matrix of large squares correspond to macroblocks and the smaller squares correspond to individual blocks of coded data. The large central square, including blocks BK4, BK5, BK8 and BK9, represents the macroblock being examined. MB_x is selected from all of the blocks BK1-BK12. If any of the neighboring blocks (BK1, BK2, BK3, BK6, BK7, BK10, BK11, BK12) is simple (i.e. exhibit a low codeword bit count), it is probable that at least one block of the macroblock will also be simple, even if each of the other blocks of the macroblock are complex. In this situation the macroblock is assumed to be of low complexity and should not be subject to a high level of quantization. A high level of complexity is associated only with macroblocks where all the associated blocks are complex (exhibit a high codeword bit count). A higher level of quantization may be applied to the more complex blocks without incurring visible artifacts.

The rate controller 18 includes a counter and memory, and during the first encoding pass, initiated by the system controller, counts the amount of quantized bits provided by the quantizer 32, for each block of the frame, and stores the respective count values. The rate controller thereafter examines the count values of groups of blocks associated with each macroblock, to determine the block of each group having the lowest count value and stores this value as MB_xi. Once all the MB_xi have been determined the controller 18 determines their average, MB_xa, and calculates the respective values MB_comp$_i$. During the second coding pass the values MB_comp$_i$ are applied to the quantizer 32 as respective macroblocks are quantized.

The global quantization values are values utilized for an entire frame or a portion of a frame. Generation of the GLOBAL_QUANT is based on a group of frames, that is, for example, the GLOBAL_QUANT$_7$ value for frame 7 (FIG. 1B) is calculated with respect to all frames in the repeating I,P,B coding sequence of frames 1-15. Nominally the GLOBAL_QUANT$_i$ value will be different for frames of different coding modes. In generating the values GLOBAL_QUANT, first a target value, GOF_TARGET, for a group of frames is calculated. If only video data is applied to the rate buffers, the amount of data, GOF_size, for a group of frames would be limited by the transmission data rate and would be equal to the number of frames in a group of frames times the rate buffer output bit rate divided by the frame rate of the input video data. This value differs from the actual data passed by the rate buffers since audio and/or auxiliary data may be added to the transmitted data, and is therefore corrected on a GOF basis. The adjustment is calculated with respect to the data generated during the previous GOF. The GOF_TARGET values are calculated as follows; GOF_TARGET$_n$=GOF_size—(GOF_TARGET$_{n-1}$—ACTUAL DATA$_{n-1}$) where GOF_TARGET$_n$ and GOF_TARGET$_{n-1}$ correspond to the TARGET values for the current and lastmost GOF, and ACTUAL DATA$_{n-1}$ is the actual amount of coded data applied to the rate buffers during the lastmost GOF. Upon startup of the system the GOF_TARGET value for the first GOF is set equal to GOF_size.

The GOF_TARGET value is divided amongst the respective frames in the GOF according to a ratio, and the amount of data space actually consumed by the previously coded frames within a GOF. Define TSize_I, TSize_P, TSize_B as the target sizes for I, P, B frames respectively in a group of frames;

LBits_I, LBits_P, LBits_B as the actual number of coded bits generated for the previous frames of the respective coding types;

LQ_I, LQ_P, LQ_B as the average quantization value for the previous frames of the respective coding types;

N_I, N_P, N_B as the numbers of I, P, B frames in a GOF;

K_I, K_P, K_B as constants (a representative ratio K_I:K_P:K_B is 15:10:15): The ratio will actually be chosen by the respective designer.

Two values, n_I and n_P,B are calculated from the forgoing parameters according to the following;

$$n\_I = (N\_I)(LBits\_I)(LQ\_I)(K\_I) +$$
$$(N\_P)(LBits\_P)(LQ\_P)(K\_P) +$$
$$(N\_B)(LBits\_B)(LQ\_B)(K\_B);$$

$$n\_P,B = (N\_P)(LBits\_P)(LQ\_P)(K\_P) +$$
$$(N\_B)(LBits\_B)(LQ\_B)(K\_B);$$

The target sizes for the respective coded frame types are calculated from;

$$TSize\_I=(GOF\text{-}TARGET)(LBits\_I)(LQ\_I)(K\_I)/n\_I;$$

$$TSize\_P=((GOF\_TARGET\text{-}LBits\_I)(LBits\_P)(LQ\_P)(K\_P)/n\_P,B;$$

$$TSize\_B=((GOF\_TARGET\text{-}LBits\_I)(LBits\_B)(LQ\_B)(K\_B)/n\_P,B.$$

After the target values TSize_i have been determined, the values EQuant_I, EQuant_P, EQuant_B, which are the expected average quantization values for next I, P, and B coded frames are calculated according to the following relationships;

$$EQuant\_P=(LQ\_P)(LBits\_P)/TSize\_P;$$

$$EQuant\_B=(LQ\_B)(LBits\_B)/TSize\_B;$$

$$EQuant\_I=(LQ\_P)(K\_P)/K\_I.$$

Respective values BS_I, BS_P, and BS_B are generated by scaling the expected quantization values by respective constants R_I, R_P, and R_B, that is $$BS\_I=(EQuant\_I)(R\_I);$$

$$BS\_P=(EQuant\_P)(R\_P);$$

$$BS\_B=(EQuant\_B)(R\_B).$$

The constant R_I may equal R_P and R_B and be proportional to the channel bit rate divided by the product of the frame rate times the maximum quantization value. A representative maximum quantization value may be set equal to 31.

During the process of coding a frame the value BS_i may be updated every m macroblocks according to the relationship:

$$BS\_i_k=BS\_i_{k-1}+mMBs-(m)(TSize\_i)/NMB$$

where the index i corresponds to I, P or B; BS_$i_k$ corresponds to the value of BS_i currently being generated; BS_$i_{k-1}$ corresponds to the last value of BS_i calculated; mMBs is the size of the amount of data for the previous m macroblocks (in bits); m is an integer number of macroblocks (preferably small); and NMB is the total number of macroblocks in the frame being coded. The value GLOBAL_QUANT is generated from $$GLOBAL\_QUANT_i=BS\_i/R\_i$$

where the index i corresponds to I, P or B as appropriate. This value is applied to the quantizer at the beginning of each respective frame period.

In review, the parameter GLOBAL_QUANT is generated by first calculating a target value corresponding to the amount of data space available for a GOF.

This target value is proportional to the transmission data rate divided by the frame rate and adjusted by the error in the target value calculated for the prior GOF. The GOF-TARGET is then proportioned to generate frame target values TSize_i for the various frames in the GOF according to the coding type. The frame target values TSize_i are calculated as a function of the number of frames of each coding type in a GOF and the amount of coded data generated for the respective types of coded frames in the prior GOF. The GLOBAL_QUANT values for the respective frames are generated from the reciprocals of the TSize_i and adjusted periodically during the coding of respective frames in accordance with the amount of coded data so far produced for the respective frame.

During the second coding pass, when the video signal is actually coded for transmission, the rate controller counts the number of coded bits provided by the quantizer, and accumulates these values as mMBs and LBits_i for updating the GLOBAL_QUANT value and calculating the target values. In addition the rate controller accumulates the quantization values over respective frames and generates the average LQ_i of the quantization values for use in generating subsequent values of GLOBAL_QUANT. The parameter ACTUAL_DATA may be obtained by counting the number of bits applied to the rate buffers in respective GOF intervals. For purposes of convenience this data need not be accumulated over a single GOF but may include data from two adjacent GOF's as long as the requisite number and types of frames are included in the interval over which data is accumulated. Ideally, if bit stuffing occurs in any of the coding apparatus between the quantizer and the rate buffers, the amount of bit stuffing should be calculated and subtracted from the accumulated data corresponding to the data applied to the rate buffers.

In the foregoing, it was noted that the proposed MPEG standard coded one field per frame, but that the exemplary HDTV MPEG-like system coded both fields per frame. The invention, however is applicable to both systems. Hence, in the claims, where the terms frames or group of frames is used they are meant to refer to the amount of data actually processed per picture or group of pictures, be it one field per frame or two fields per frame etc.

What is claimed is:

1. In a video signal compression apparatus of the type which provides compressed frames of data arranged as macroblocks of data, said macroblocks including a plurality in blocks of coded data susceptible of quantization, quantizing apparatus comprising:
   a quantizer receptive of said macroblocks of data for quantizing coded data according to a predetermined quantizing function on a macroblock-by-macroblock basis and responsive to a complexity control signal for altering said quantizing function;
   means, responsive to blocks within and adjacent respective macroblocks of data for generating said complexity control signals for said respective macroblocks.

2. The apparatus set forth in claim 1 wherein said means for generating said complexity control signals includes means for A) determining the amount of data in respective blocks of respective frames; B) for each macroblock, determining the amount of data MB_x in the block of a group of blocks associated with said macroblock, having the least data; C) calculating the average MB_xa of a plurality of the MB_x in a frame; and D) calculating complexity control signals for respective macroblocks as a function of the corresponding MB_x and said average.

3. The apparatus set forth in claim 2 wherein said complexity signal is calculated according to the relation $$((K1)(MB\_x)+MB\_xa)/((K2)(MB\_xa)+MB\_x)$$

wherein K1 and K2 are predetermined constants.

4. The apparatus set forth in claim 2 wherein blocks associated with said macroblock comprise the blocks included within said macroblock and blocks located immediately adjacent the periphery of said macroblock.

5. The apparatus set forth in claim 1 further including:
   means for conditioning said quantizer to quantize all macroblocks within a frame with the same quantizing function during a first quantizing pass, and for quantizing the macroblocks within said frame with a quantizing function altered by said complexity signal during a second quantizing pass, and wherein said means for generating said complexity control signals is responsive to blocks of quantized data generated during said first quantizing pass.

6. The apparatus set forth in claim 5 wherein said means for generating said complexity control signals includes means for A) determining the amount of quantized data in respective blocks of respective frames; B) for each macroblock, determining the amount of data MB_x in the block of a group of blocks associated with said macroblock, having the least data; C) calculating the average MB_xa of a plurality of the MB_x in a frame; and D) calculating complexity control signals for respective macroblocks as a function of the corresponding MB_x and said average.

7. The apparatus set forth in claim 6 wherein said complexity signal is calculated according to the relation $$((K1)(MB\_x)+(K3)(MB\_xa))/((K2)(MB\_xa)+(K4)(MB\_x))$$

wherein K1, K2, K3 and K4 are predetermined constants.

8. The apparatus set forth in claim 1 wherein respective frames of data are coded according to a cyclical sequence of coding modes, each cycle comprising a plurality of frames designated GOF, and said apparatus further includes:
   means for calculating a target value corresponding to the amount of expected quantized data for respective groups of frames, and which is a function of the error between the actual amount of quantized data generated for the previous GOF and the target value calculated for said previous GOF;
   means for proportioning said target value amongst respective frames in a GOF and generating global quantization values for respective frames in a group of frames; and
   wherein said quantizer is responsive to both said global quantization values and said complexity signal for altering said quantization function.

9. The apparatus set forth in claim 8 wherein said means for proportioning said target value includes means for periodically updating said global quantization values within a frame as a function of the amount of quantized data generated between update periods.

* * * * *